3,030,237
CONDUCTIVE COATING

James E. Price, Columbus, Ohio, assignor to North American Aviation, Inc.

No Drawing. Filed Sept. 15, 1959, Ser. No. 840,024
16 Claims. (Cl. 117—227)

This invention concerns an improved conductive coating, and also relates to non-metallic articles of manufacture which are additionally provided with a thin conductive coating to develop required electrical performance characteristics. My invention is particularly important with respect to antennas, printed electrical circuits, and the like which include non-conducting base or support elements that have excellent dielectric properties and that are often light-weight.

Heretofore conductive coatings developed for use in connection with non-metallic antenna forms, printed-type electrical circuit boards, and other electrical equipments have been characterized by unacceptably high electrical resistivity or unacceptably low adhesion to the non-conducting base element. I have discovered a new coating material having a proper selection of metallic pigmentation and which will provide non-metallic base structures with improved electrical operating characteristics when properly applied thereto. As noted above, my invention has been found particularly useful with respect to radar antennas, printed-type electrical circuit boards, and like items of electrical equipment.

Accordingly, it is a prime object of my invention to provide a new coating material for application to surfaces of non-conducting base element and which obtains a decreased resistivity in comparison with conventional conductive coatings.

Another object of this invention is to provide an improved item of electrical equipment that is made essentially of a non-conducting, light-weight base material and which has an adhering conductive coating that obtains an improved degree of electrical surface conductivity.

Another object of this invention is to provide a conductive coating which has improved adhesion with respect to typical non-conducting materials utilized in electrical equipment as base structure elements.

A still further object of this invention is to provide a conductive coating which may be applied to electrical equipment and which develops improved degrees of hardness, resistance to abrasion, resistance to temperature cycling, and corrosion (salt spray) resistance, as well as increased electrical conductivity.

Another object of my invention is to provide an improved conductive coating and improved electrical equipment articles which may be readily and economically compounded and manufactured using conventional techniques and apparatus and which consistently obtain improved adhesion and electrical operating advantages.

Other objects and advantages of this invention will become apparent from a consideration of the following detailed description.

The improved coating material utilized in connection with this invention is essentially comprised of an organic resin carrier and a suitable metallic pigment. Such improved coating also typically includes a drier. It is preferred that the coating be compounded as hereinafter described and applied to a non-conducting base member such as an antenna form or a circuit board. The resulting coating and the electrical equipment end item have improved adhesion and electrical operating characteristics in comparison with conventional conductive coating materials applied to similar electrical equipment items.

The following examples set forth composition details of a conductive coating which incorporates the features of my invention and which obtains the heretofore-recited advantages.

*Example I*

| | Grams |
|---|---|
| Carrier, modified phenolic resin, 40% solids in solvent | 100 |
| Pigment, silver flake particles, 44 microns maximum size | 75 |
| Pigment, silver ball particles, 44 microns maximum size | 75 |
| Drier, 6% cobalt napthanate | 0.2 |

*Example II*

| | |
|---|---|
| Carrier, modified phenolic resin, 40% solids in solvent | 100 |
| Pigment, silver flake particles, 44 microns maximum size | 90 |
| Pigment, silver ball particles, 44 microns maximum size | 60 |
| Drier, 6% cobalt napthanate | 0.2 |

*Example III*

| | |
|---|---|
| Carrier, modified phenolic resin, 40% solids in solvent | 100 |
| Pigment, silver flake particles, 44 microns maximum size | 60 |
| Pigment, silver ball particles, 44 microns maximum size | 90 |
| Drier, 6% cobalt napthanate | 0.2 |

In connection with the above examples, I prefer that a phenolic resin carrier be utilized as the carrier resin or coating binder. Other organic resins, such as modified alkyd and modified polyester resin typically utilized in the manufacture or organic finishes, can be employed in combination with the herein described metallic pigments. I prefer the phenolic resin carrier because of the hardness property which may be developed in the end-product coating. Also, the recited phenolic resin carrier is typically modified with a urea additive to promote the polymerization process.

It is important that care be taken with respect to the selection of the metallic pigment contained in the coating material of my invention. I have discovered that the lowered electrical resistivity (increased conductivity) and the improved adhesion characteristics which are developed by this invention are dependent upon the size, shape, and composition of the included pigment particles. First, I find that the size or maximum dimension of all pigment particles should be approximately 44 microns (0.0017″) or less. Second, I have discovered that the total pigment content should be comprised of pigment flake particles and pigment ball particles in the proportions indicated. As set forth in the examples, the pigment flake particles should comprise from approximately 40% to 60% by weight of the total pigment particle inclusion, and the balance of the total pigment content should be of pigment ball particles. Third, I prefer that the pigment particles be made of silver. Other metals such as aluminum, copper, and gold have been utilized but with appreciably less advantage. Problems of gassing and settling have been encountered in connection with certain of the other metals.

Pigment ball particles are essentially defined as non-perfect, and sometimes irregular, spherical-like particles which are often formed by the atomization and subsequent immediately cooling of molten pigment material. Pigment flake particles are esesntially defined as generally flat, thin, and often irregular, plate-like elements such as pigment particles which have been formed by rolling or hammering pigment ball particles. Such flake and ball particles are conveniently formed from silver utilizing known apparatus and techniques.

It should be noted that the improved conductive coating of this invention includes the organic resin carrier and metallic pigment in a solids weight ratio of approximately 40:150. I find that substantial departures from this weight ratio often leads to the introduction of problems relating to adhesion, settling, and the like. Such problem may often be referenced in terms of establishing a proper pigment volumetric concentration. Accordingly, comparatively minor changes in the solids weight ratio may be experienced in connection with the selection of carrier resins and metallic pigments having different densities.

The above-specified coatings also include a drier, such as 6% cobalt naphthanate, to aid in producing the desired end product. Metallic driers such as 24% lead naphthanate, combinations of zinc naphthanate, or other known conventional drying agents might be utilized.

The aforedescribed coating materials have been successfully applied to annularly slotted L-band radar antenna forms and to circuit board structure elements. For instance, I have applied such coatings to radar antennas fabricated with antenna forms made of an epoxide resin catalyzed with an aromatic amine and reinforced with glass fibers. Details of the method of application of the coating of this invention to such laminated articles are set out below.

If the thickness of the base form is more than approximately 0.010″, it is preferred that the surface to receive the coating be lightly scuffed with a very fine abrasive. The part is afterwards cleaned of the dust formed in the abrading operation and subsequently vapor-degreased using conventional techniques. Afterwards the part should be oven-dried at a suitable temperature. In connection with epoxide-laminated glass fibers, I prefer that the laminate be baked at approximately 400° F. for one hour.

If pinhole defects or the like are present in the to-be-coated surface of the base form, I recommend that such defects be obscured using the conducting coating of this invention as a filler and using a squeegeeing technique.

To prepare the conductive coating compositions of my invention for application by spraying or brushing, I prefer that the compositions be mixed with commercial xylene or a like thinner to give a measured viscosity of approximately 12 to 18 seconds in a No. 4 Ford cup.

The receiving surface of the so-prepared part is then coated with a sufficient quantity of the improved conductive coating of my invention to provide a dry film thickness measured by the finally cured composition of approximately 0.001″. The thinned coating material may be applied, as heretofore-mentioned, by either a spraying, brushing, or other technique. The part should then be air-dried at room temperature in a dust-free atmosphere prior to the final curing operation. In connection with the abovedescribed composition I prefer that the air-drying operation be carried out for at least four hours.

For final curing the coated part is preferably placed in a cool baking oven and then heated slowly to a temperature level of approximately 350° F. The coated part is maintained at that elevated temperature level for preferably six hours to accelerate polymerization of the coating material. Such part is then cooled to room temperature.

A generally similar method may be utilized to properly adhere the conductive coating of this invention to other non-conducting base element materials. The precise values as to time and temperature will depend for the most part on the particular carrier resin that is selected and upon the composition of the base element material. I have successfully applied the coating of this invention to base members which were fabricated of compression molded phenolic resins, to polyester materials, to styrenes, and to acrylics. Also, the coating compositions heretofore described are thought entirely suitable for application to the surfaces of base elements fabricated from ceramic compositions. Essentially, it is only required that the non-conducting portion of the electrical equipment item be provided with sufficient rigidity to provide for good structural integrity.

The surface electrical resistivity obtained in connection with the coating and equipment items of my invention, as measured in the conventional ohm-centimeter dimension, is particularly important. The above detailed compositions are effective to consistently obtain a film surface resistivity of $25.4\times10^{-6}$ ohm-centimeters or less. By way of comparison the ohm-centimeter resistivity values for the pure metals of aluminum, copper, lead, silver, and mercury are accepted as being $2.655\times10^{-6}$, $1.682\times10^{-6}$, $20.46\times10^{-6}$, $1.62\times10^{-6}$, and $95.8\times10^{-6}$, respectively. The commercially available conductive coating materials with which I am familiar typically best obtain a resistivity value of not lower than approximately $165\times10^{-6}$ ohm-centimeters. For numerous electrical equipment applications I find that electrical resistivity of a thin conductive film should be at least below approximately $63\times10^{-6}$ ohm-centimeters.

The advantages of this invention are somewhat related to a proper pigment volumetric concentration in the coating proper. When the degree of pigment concentration becomes unnecessarily high, as through a greater metallic pigmentation content to increase electron conductivity, substantial sacrifices in coating adhesion result. However, through proper selection of pigment flake particles and pigment ball particles the advantages of my invention are readily obtained.

I have noted that the cured or polymerized coating of this invention offers another advantage. In connection with printed-type circuit boards, conventional wire leads may be silver-soldered to the cured coating using an entirely common silver-soldering technique. No deterioration or break-down of the conductive coating ensues.

It will be appreciated that changes may be made in the compositions and procedures herein disclosed without departing from the spirit of the invention as defined in the subjoined claims.

I claim:

1. An improved conductive coating material comprised by weight of approximately 40 parts non-conductive carrier resin solids and of approximately 150 parts metallic pigmentation, said pigmentation consisting of near-equal parts by weight of fine flake particles and of fine ball particles.

2. A conductive coating material consisting of a mixture of a non-conducting carrier resin and metallic pigmentation, said metallic pigmentation being comprised by weight of approximately 40% to 60% metallic flake particles and the balance of metallic ball particles.

3. The composition recited in claim 2, wherein said flake and ball pigmentation particles have an approximately maximum dimension of 44 microns.

4. The composition defined in claim 2, wherein said carrier resin and said metallic pigmentation exist in the ratio of 40 parts to 150 parts by weight on a solids basis.

5. A conductive coating for electrical equipment and comprised of: a non-conducting organic carrier resin, and silver pigmentation particles mixed with said resin and having a maximum size of approximately 44 microns, said silver pigmentation particles including near-equal parts by weight of silver flake particles and silver ball particles.

6. The coating material defined in claim 5, wherein said silver ball particles comprise from approximately 40% to approximately 60% of the total silver pigmentation particles, the balance of said total pigmentation particles being silver flake particles.

7. The composition defined in claim 5, wherein said carrier resin and said metallic pigmentation particles are mixed in a predetermined solids weight ratio, said weight ratio being approximately 40 parts carrier resin in 150 parts silver pigmentation particles.

8. A conductive coating material for application to non-conductive base portions of an electrical equipment item and consisting of: approximately 40 parts by solids weight of a carrier resin, and approximately 150 parts by solids weight of silver pigmentation particles, said silver pigmentation particles having a maximum dimension of less than approximately 44 microns and being comprised of from approximately 40% to 60% by weight silver flake pigmentation particles and the balance silver ball pigmentation particles.

9. An improved coating material which includes: modified phenolic carrier resins in the amount of 40 parts solids weight, and metallic pigmentation particles in the amount of 150 parts solids weight, said metallic pigmentation particles being comprised of near-equal portions of fine ball-type particles and fine flake-like particles.

10. The composition defined in claim 9, wherein said metallic pigmentation particles have a maximum dimension less than approximately 0.0017 inch.

11. The composition defined in claim 10, wherein said pigmentation particles are comprised of silver.

12. An improved conductive coating material which is comprised of: a modified phenolic resin carrier, and silver ball and flake pigmentation particles, said phenolic resin carrier and said pigmentation particles having a solids weight ratio of approximately 40:150, and said silver ball and flake pigmentation particles having a maximum dimension of approximately 44 microns and being included in the total pigmentation particles content in an amount of from 40% to 60% by weight each.

13. An electrical equipment item having a non-metallic base element, and having an electron-conducting coating adhered to said base element, said coating including: an adhering, non-conducting carrier resin, and silver ball and flake pigmentation particles of a size not greater than 44 microns maximum dimension.

14. The equipment item defined in claim 13, wherein said coating carrier resin and said coating silver pigmentation exist in a solids weight ratio of approximately 40:150, and wherein said ball and flake pigmentation particles exist in a weight ratio of approximately 1:1.

15. An electron-conducting electrical equipment item which consists of a non-conducting support and a thin conducting coating adhered to said support, said conducting coating comprising a modified phenolic resin in the amount of approximately 40 parts solids by weight and having silver pigmentation particles of less than 44 microns maximum dimension in an amount of approximately 150 parts solids by weight, said silver pigmentation particles consisting of from 40% to 60% ball-type particles and the balance flake-type particles.

16. An improved electrical equipment item for conducting electrons, and comprised of: a base member fabricated of glass fibers laminated with epoxide resins, and a polymerized conductive coating adhered to said base member, said conductive coating having a phenolic resin carrier in the amount of approximately 40 parts solids by weight and having silver pigmentation particles in the amount of approximately 150 parts solids by weight, said silver pigmentation particles being less than approximately 0.0017 inch in maximum dimension and consisting of from 40% to 60% ball-type particles and the balance flake-type particles.

References Cited in the file of this patent

UNITED STATES PATENTS

| | | |
|---|---|---|
| 2,774,747 | Wolfson et al. | Dec. 18, 1956 |
| 2,808,352 | Coleman et al. | Oct. 1, 1957 |
| 2,851,380 | Berlinghof | Sept. 9, 1958 |

OTHER REFERENCES

"Patent Survey on Powder Metallurgy" (Deller), a paper presented at Powder Metallurgy Conf., Massachusetts Institute of Technology, Aug. 29–31, 1940.

"Printed Circuit Techniques" (Brunetti), National Bureau of Standards Circular 468, 1947 (pages 5, 6 and 7 relied on).

"Printed Circuit Technique," "Automation in the Electronic Industry" (Russell), Communications and Electronics, February 1955.